(12) United States Patent
Patterson

(10) Patent No.: US 11,260,945 B1
(45) Date of Patent: Mar. 1, 2022

(54) PROPELLER NUT

(71) Applicant: Robert S Patterson, Church Road, VA (US)

(72) Inventor: Robert S Patterson, Church Road, VA (US)

(*) Notice: Subject to any disclaimer, the term of this patent is extended or adjusted under 35 U.S.C. 154(b) by 691 days.

(21) Appl. No.: 15/063,330

(22) Filed: Mar. 7, 2016

Related U.S. Application Data

(60) Provisional application No. 62/129,084, filed on Mar. 6, 2015.

(51) Int. Cl.
*B63H 1/20* (2006.01)
*B64C 11/02* (2006.01)

(52) U.S. Cl.
CPC .............. *B63H 1/20* (2013.01); *B64C 11/02* (2013.01)

(58) Field of Classification Search
CPC .. F04D 29/20; F04D 29/2261; F04D 29/2266; F04D 29/181; B63H 1/20; B64C 11/02; B64C 11/04; B64C 11/14; F16B 37/00; F16B 37/14; F16B 33/004
USPC ..... 416/244 R, 244 A, 244 B, 245 R, 245 A; 411/427, 429, 371.1
See application file for complete search history.

(56) References Cited

U.S. PATENT DOCUMENTS

| | | | | |
|---|---|---|---|---|
| 407,904 A * | 7/1889 | Sears | ...................... | F16B 37/14 411/429 |
| 519,468 A * | 5/1894 | Stewart | ..................... | B60B 3/14 301/114 |
| 1,920,880 A * | 8/1933 | Parker | ..................... | B64C 11/04 416/175 |
| 2,111,245 A * | 3/1938 | Irgens | ...................... | B63H 1/15 416/2 |
| 2,353,431 A * | 7/1944 | Arden | ..................... | A63H 27/02 416/245 R |
| 2,535,527 A * | 12/1950 | Barkley | .................. | A63H 27/02 416/212 R |
| 2,569,144 A * | 9/1951 | Benson | ................... | F16D 7/028 416/169 R |
| 2,613,967 A * | 10/1952 | Coffing | .................... | B63H 1/20 403/245 |
| 3,045,763 A * | 7/1962 | Perrott | ..................... | B63H 1/20 416/134 R |
| 3,132,698 A * | 5/1964 | Lesher | ..................... | B63H 1/20 416/220 R |
| 3,548,704 A * | 12/1970 | Kutryk | .................... | F16B 37/14 411/373 |
| 3,703,341 A * | 11/1972 | Garofalo | ................ | A63H 27/02 416/245 R |
| 3,727,574 A * | 4/1973 | Bagge | .................. | B63H 20/002 440/66 |

(Continued)

*Primary Examiner* — David E Sosnowski
*Assistant Examiner* — Wayne A Lambert
(74) *Attorney, Agent, or Firm* — Harvey Law, PC

(57) ABSTRACT

The invention comprises an improved nut for securing a propeller to a drive shaft of a vehicle engine. The invention further comprises a nut that may be securely fastened to the end of the drive shaft of a trolling motor engine without the use of separate tools, such as wrenches or drivers. The invention even further comprises a nut with an exterior portion and a shaft portion that communicates along an axis of the drive shaft of a marine engine against the propeller assembly, the shaft portion having elastomeric materials to interface with the propeller assembly and at least one channel which together absorb vibration, heat and sound from the propeller assembly.

17 Claims, 10 Drawing Sheets

(56) References Cited

U.S. PATENT DOCUMENTS

| | | | | |
|---|---|---|---|---|
| 4,175,605 A * | 11/1979 | Johnson | B63H 23/34 |
| | | | 411/290 |
| 4,201,110 A * | 5/1980 | Hanai | F16B 37/00 |
| | | | 411/429 |
| 4,391,567 A * | 7/1983 | Ciampolillo | B63H 23/34 |
| | | | 416/146 R |
| 4,701,151 A * | 10/1987 | Uehara | B63H 23/34 |
| | | | 416/134 R |
| 5,135,358 A * | 8/1992 | Myers | B63H 1/20 |
| | | | 416/244 B |
| 5,188,495 A * | 2/1993 | Jones, Jr. | F16B 43/001 |
| | | | 285/220 |
| 5,431,518 A * | 7/1995 | Young | F16B 33/004 |
| | | | 411/429 |
| 5,445,545 A * | 8/1995 | Draper | B63H 20/007 |
| | | | 440/6 |
| 5,498,183 A * | 3/1996 | Riviera | B63B 17/00 |
| | | | 114/364 |
| 5,509,766 A * | 4/1996 | Leuschner | F16B 39/282 |
| | | | 411/186 |
| 5,590,992 A * | 1/1997 | Russell | B60B 7/14 |
| | | | 301/37.374 |
| D412,557 S * | 8/1999 | Palestrant | D23/214 |
| 6,224,340 B1 * | 5/2001 | Lessig, III | F04D 29/263 |
| | | | 411/188 |
| 6,244,807 B1 * | 6/2001 | Garcia | F16B 33/004 |
| | | | 411/369 |
| 6,390,866 B1 * | 5/2002 | Nystrom | B63H 5/125 |
| | | | 440/57 |
| 6,682,386 B2 * | 1/2004 | Lee | A63H 23/04 |
| | | | 277/510 |
| 7,048,510 B2 * | 5/2006 | Hedlund | B63H 5/165 |
| | | | 204/196.37 |
| 7,223,073 B2 * | 5/2007 | Dean | B63H 1/20 |
| | | | 416/134 R |
| 7,527,479 B2 * | 5/2009 | Shi | F01D 5/025 |
| | | | 416/241 A |
| 2012/0074257 A1 * | 3/2012 | Bessho | B64D 45/02 |
| | | | 244/1 A |
| 2014/0356174 A1 * | 12/2014 | Wang | B64C 39/024 |
| | | | 416/204 R |
| 2017/0108029 A1 * | 4/2017 | Song | F16B 33/004 |

* cited by examiner

PROPELLER NUT

This application claims the benefit of U.S. provisional application No. 62/129,084, filed on Mar. 6, 2015.

BACKGROUND OF THE INVENTION

The invention comprises an improved nut for securing a propeller to a drive shaft of a vehicle engine. The invention further comprises a nut that may be securely fastened to the end of the drive shaft of a trolling motor engine without the use of separate tools, such as wrenches or drivers. The invention even further comprises a nut with an exterior portion and a shaft portion that communicates along an axis of the drive shaft of a marine engine against the propeller assembly, the shaft portion having elastomeric materials to interface with the propeller assembly and at least one channel which together absorb vibration, heat and sound from the propeller assembly.

1. Field of the Invention

The present invention specifically relates to propeller driven engines and solutions for locking a propeller onto a drive shaft that serves as an axis upon which the propeller mounts, the drive shaft being turned by an engine of any number of water, land or airborne crafts.

2. Description of Related Art

Propeller securing nuts are well known in the arts and typically require the use of wrench or driven secured nuts that require external tools. Propeller nuts in the industry have used 0-rings but for waterproofing or sealing purposes, for example in U.S. Pat. No. 4,538,962, which seals a cover cap for the nut.

Other propeller connections and nuts are of insufficient dimension, material and structure to provide qualities sought by users of marine craft that utilize propeller propulsion. There remains a need for a nut that is easily and manually applied to the propeller shaft. There further remains a need for a propeller nut that can dampen the sounds and harmonics that emanate from the motion of the propeller about the propeller shaft. There remains even further a need for a solution that reduces the heat that is generated from the operation of the motor.

SUMMARY OF THE INVENTION

These and other objects were met with the present invention. In one embodiment, the present invention discloses a propeller securing nut that secures upon a threaded axis of a propeller assembly, the nut comprising an exterior portion having a terminal end, at least a portion of the exterior portion having a topographical feature, a propeller end of the nut on the axially opposite of the terminal end, a shaft portion of the nut between the propeller end and the exterior portion, the shaft portion having an opening to a shaft of the nut into which the axis of the propeller assembly may engage and secure the nut, a propeller engaging portion towards the propeller end of the shaft portion having a removeable elastomeric material disposed about the shaft portion of the nut, wherein a user may manually grip the topographical features of the nut to turn it and thus the threaded shaft of the nut into the threaded portion of the propeller assembly until the elastomeric material engages against a cup-like chamber of the propeller assembly so that the nut absorbs and releases the resulting heat and noise emanating from the propeller assembly, the propeller engaging portion further comprising a face of the shaft, the face defining a groove into which the elastomeric material may be placed, the groove being disposed between an outer perimeter of the shaft portion and the shaft of the nut, the shaft further comprising internal threads for affixing to the threaded axis of the propeller assembly, the face of the shaft portion being positioned approximately perpendicular to the shaft portion of the nut, the shaft portion having a lesser diameter than the external portion, forming a face of the exterior portion, the elastomeric material resembling a washer and is friction fit around the shaft portion, the elastomeric material substantially covering the face of the exterior portion, the groove being disposed within the face of the shaft portion, the topographical feature being raised or indented and being linear or non-linear, or further comprising linear elements disposed in an axial orientation.

In another embodiment, the present invention discloses a propeller securing nut that secures upon a threaded axis of a propeller assembly and comprises an exterior portion including a gripping surface and a conical section that terminates in a terminal end, at least a portion of the gripping surface having topographical features, a propeller end of the nut on the opposite axial side as the terminal end, a shaft portion of the nut between the propeller end and the exterior portion, the shaft portion having an opening to a shaft of the nut into which the axis of the propeller assembly may engage and secure the nut, the shaft portion having a shaft face positioned towards the propeller of the nut, at least one channel extending between the shaft face and the exterior portion of the nut, whereby the nut absorbs and releases the resulting heat and noise emanating from the propeller assembly, a propeller engaging portion towards the propeller end of the shaft portion having a removeable elastomeric material disposed about the shaft portion of the nut, wherein a user may grip the topographical feature of the nut to turn it and thus the threaded shaft of the nut into the threaded portion of the propeller assembly until the elastomeric material engages against a cup-like chamber of the propeller assembly so that the nut may absorb and transfer the resulting noise emanating from the propeller assembly, the at least one channel extending between an opening at a face of the shaft portion and an opening at the exterior portion of the nut, the at least one channel comprising between 2 and 10 channels extending between the shaft face and the exterior portion of the nut, the elastomeric material comprising an O-ring.

In still another embodiment, the present invention may comprise a propeller securing nut that secures upon a threaded axis of a propeller assembly, the nut comprising an exterior portion including a gripping surface and a terminal end, at least a portion of the gripping surface having topographical features, a propeller end of the nut on the opposite axial side as the terminal end, a shaft portion of the nut between the propeller end and the exterior portion, the shaft portion having an opening to a shaft of the nut into which the axis of the propeller assembly may engage and secure the nut, the shaft portion having a shaft face positioned towards the propeller of the nut, at least one channel extending between the shaft face and the exterior portion of the nut, whereby the nut absorbs and releases the resulting heat and noise emanating from the propeller assembly, the at least one channel extending between an opening at a face of the shaft portion and an opening at the exterior portion of the nut and comprising between 3 and 6 channels extending between the shaft face and the exterior portion of the nut, the shaft portion face positioned approximately perpendicular to the shaft portion of the nut, the opening at the exterior portion of the nut is perpendicular to the shaft portion of the nut, a portion of the channel being exposed at the exterior portion, the opening at the exterior portion of the nut emerging completely at the surface of the exterior portion, the topographical feature comprising linear elements disposed in an axial orientation along the gripping surface of the nut.

BRIEF DESCRIPTION OF THE DRAWINGS

The invention will now be described in greater detail with reference to the drawings.

DETAILED DESCRIPTION OF THE INVENTION

The present invention provides a propeller nut that resolves a number of shortcomings reflected in the prior art, resulting in a solution that user-friendly and environmentally superior. First, the present invention reduces noise emanating from the interaction between the marine engine drive shaft and propeller, lowering noise pollution and disruption of the marine habitat. In marine craft used for fishing, this solution also provides anglers the tactical advantage of remaining stealth in approaching areas where fish gather. Second, the present invention meets the objective of reducing the maintenance and tooling needed by the owner of the marine craft. Rather than using wrenches and drivers to take the nut and propeller off during maintenance or security, the present invention is engaged by hand. Third, the present invention acts as a heat sink, transferring heat from the armature shaft of the propeller assembly, reducing the adverse effects of excessive heat that would otherwise transfer to the battery and motor of the marine craft.

Figure 2:
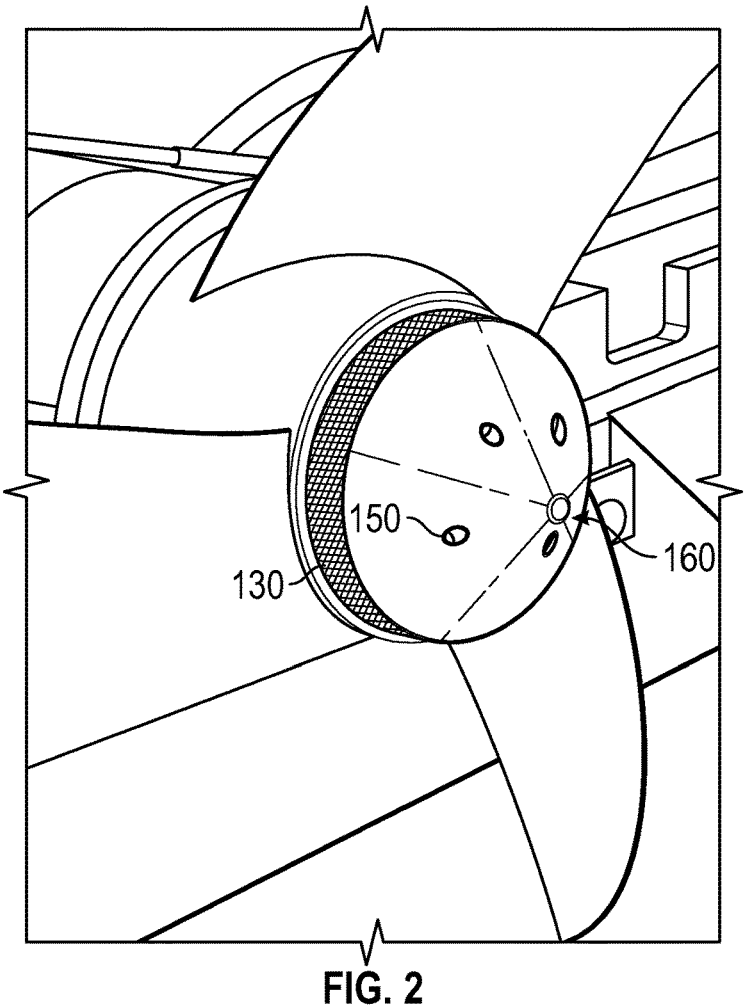
FIG. 2 shows a rear side perspective view of an embodiment of the inventive nut affixed to a propeller.
Figure 3:
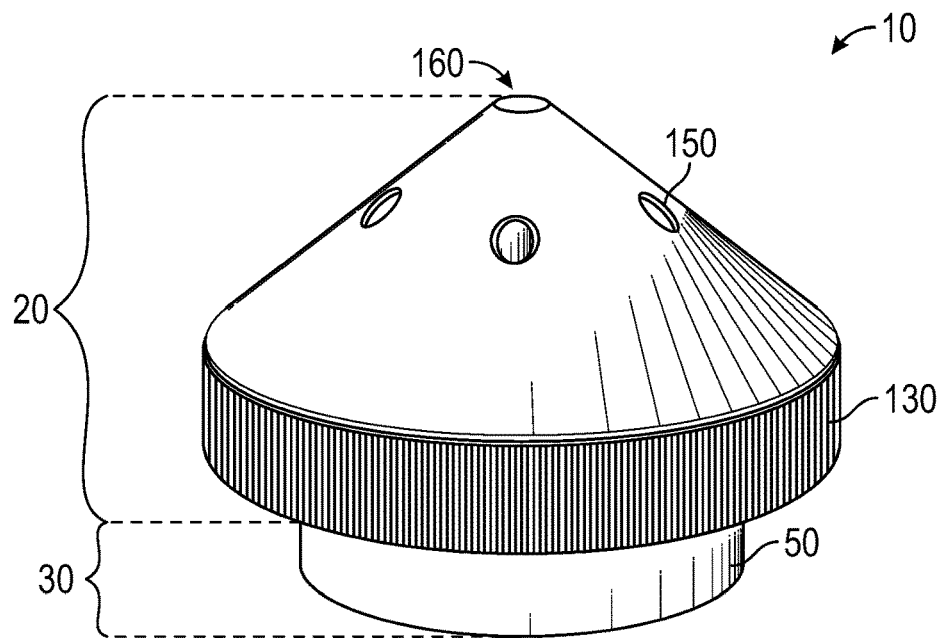
FIG. 3 shows a perspective view of the exterior portion of an embodiment of the inventive nut.
Figure 4:
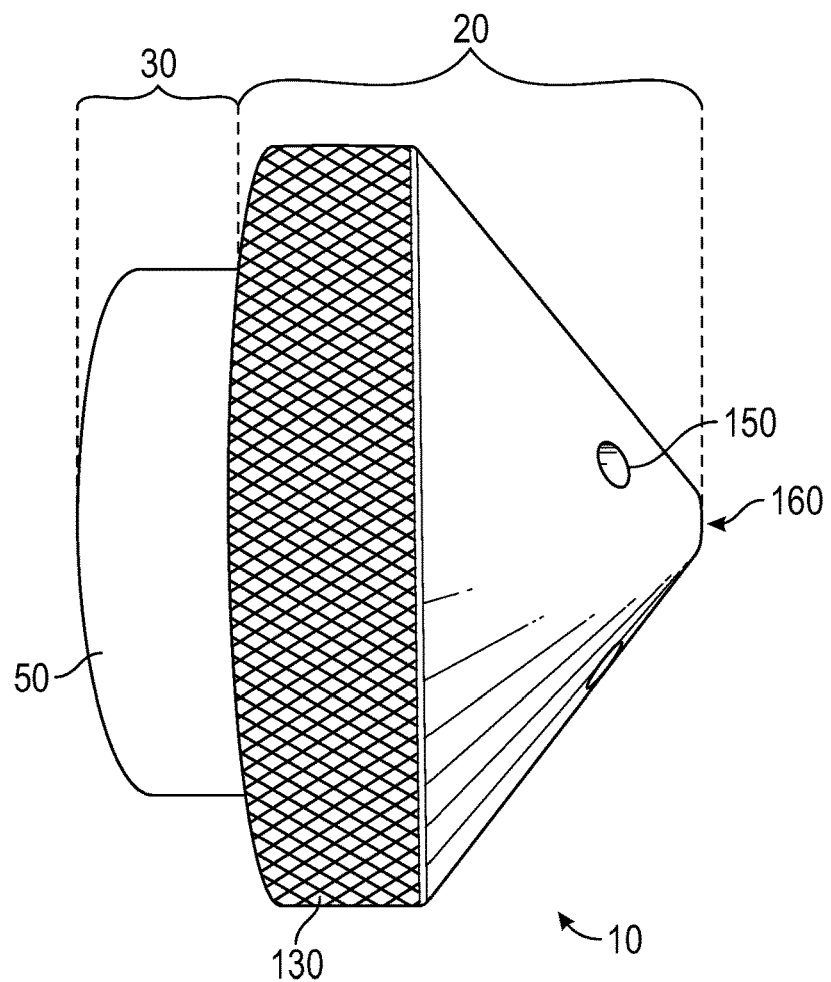
FIG. 4 shows a side view of the inventive nut having another embodiment of a gripping surface.
Figure 5:
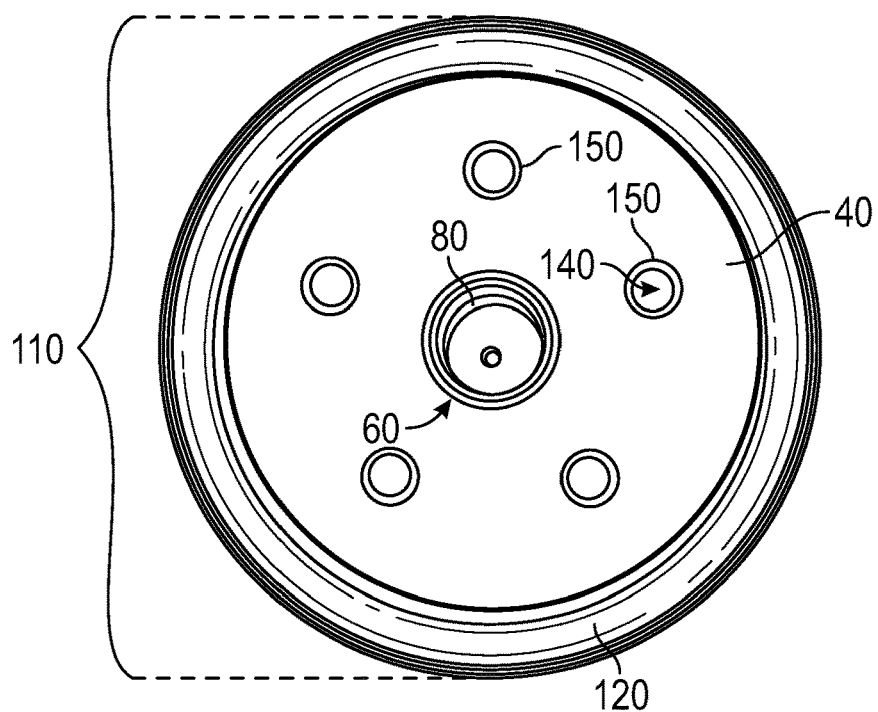
FIG. 5 shows an axial view of the propeller engaging portion of an embodiment of the inventive nut.
Figure 6:
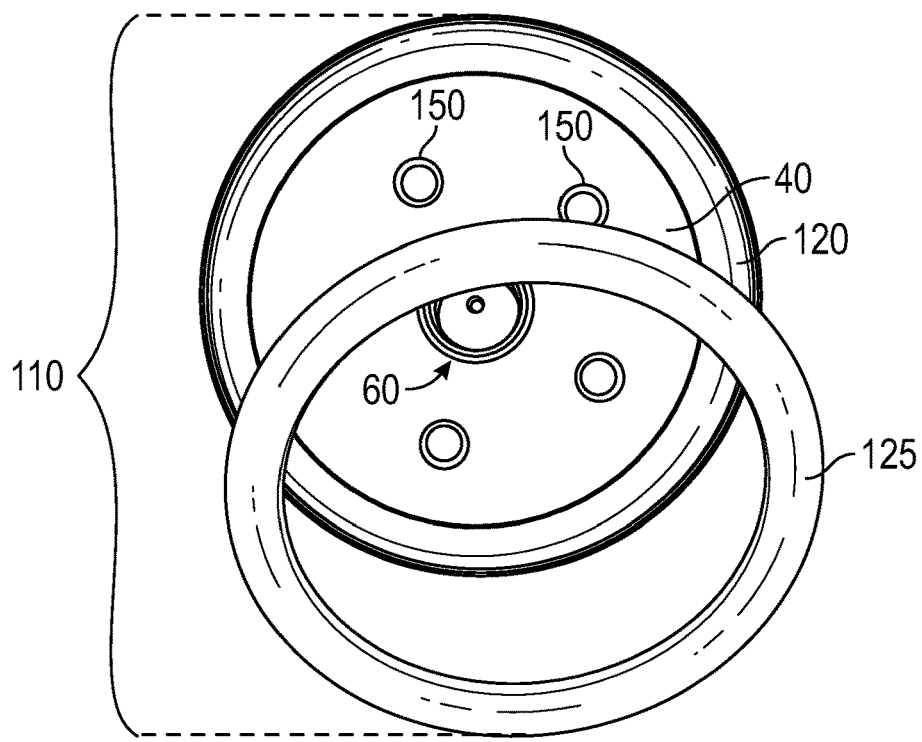
FIG. 6 shows a partially exploded view of the propeller engaging portion of an embodiment of the inventive nut and elastomeric material that may fit about the propeller engaging portion.
Figure 7:
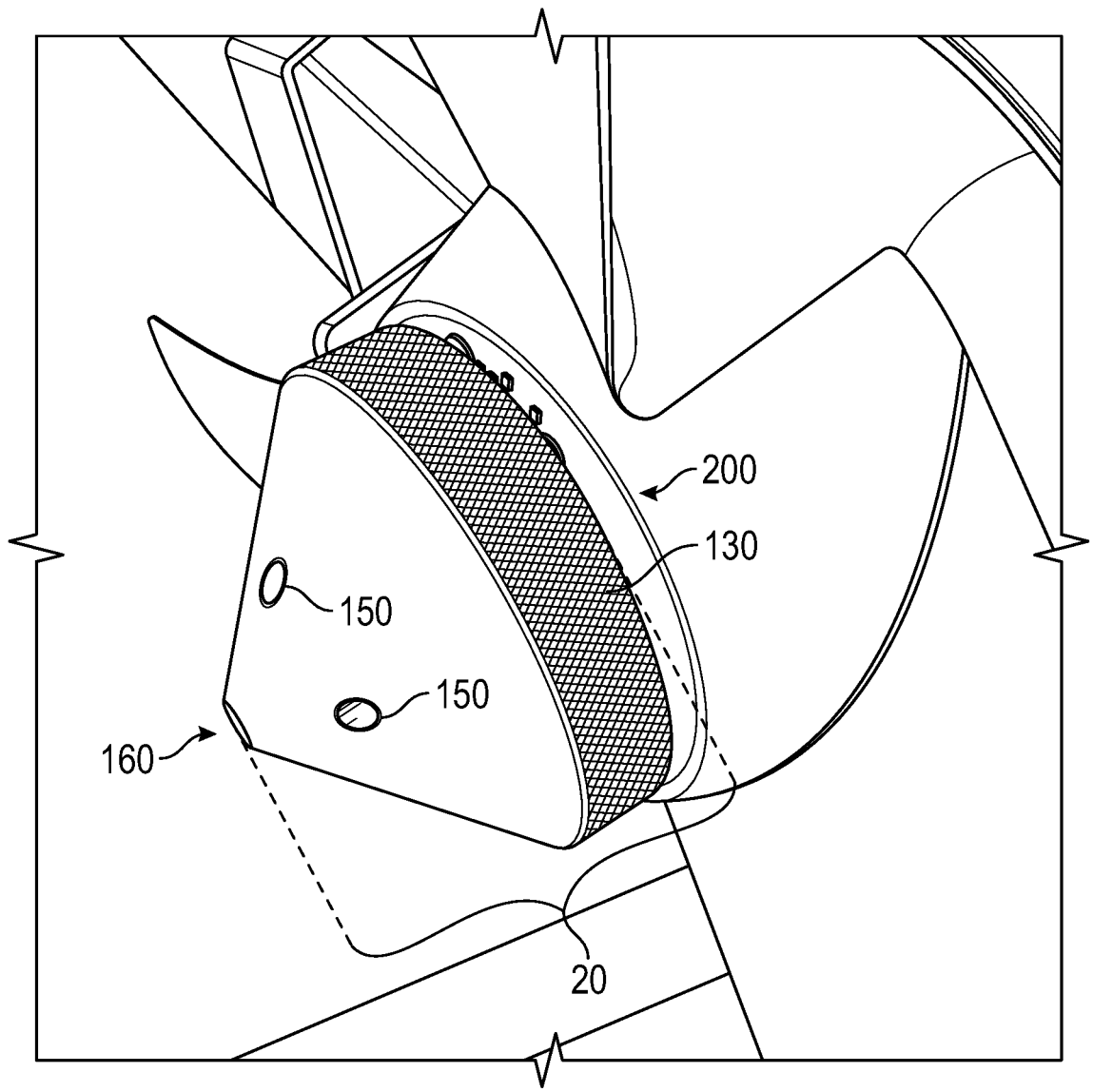
FIG. 7 shows a perspective view of the exterior portion of an embodiment of the inventive nut as it is partially engaged upon a propeller.
Figure 8:
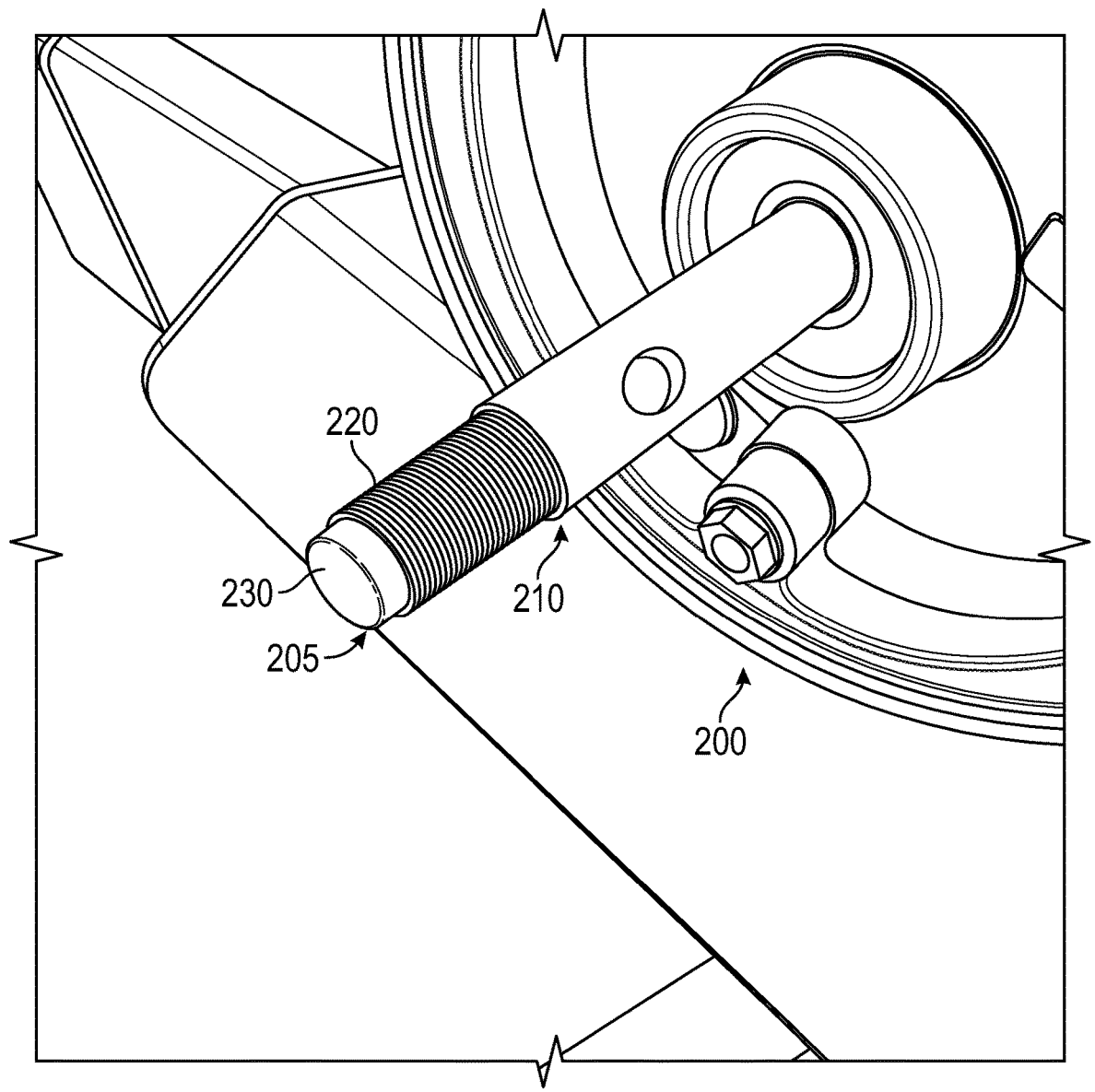
FIG. 8 shows a propeller axis of a typical marine engine upon which the inventive nut may affix.
Figure 9:
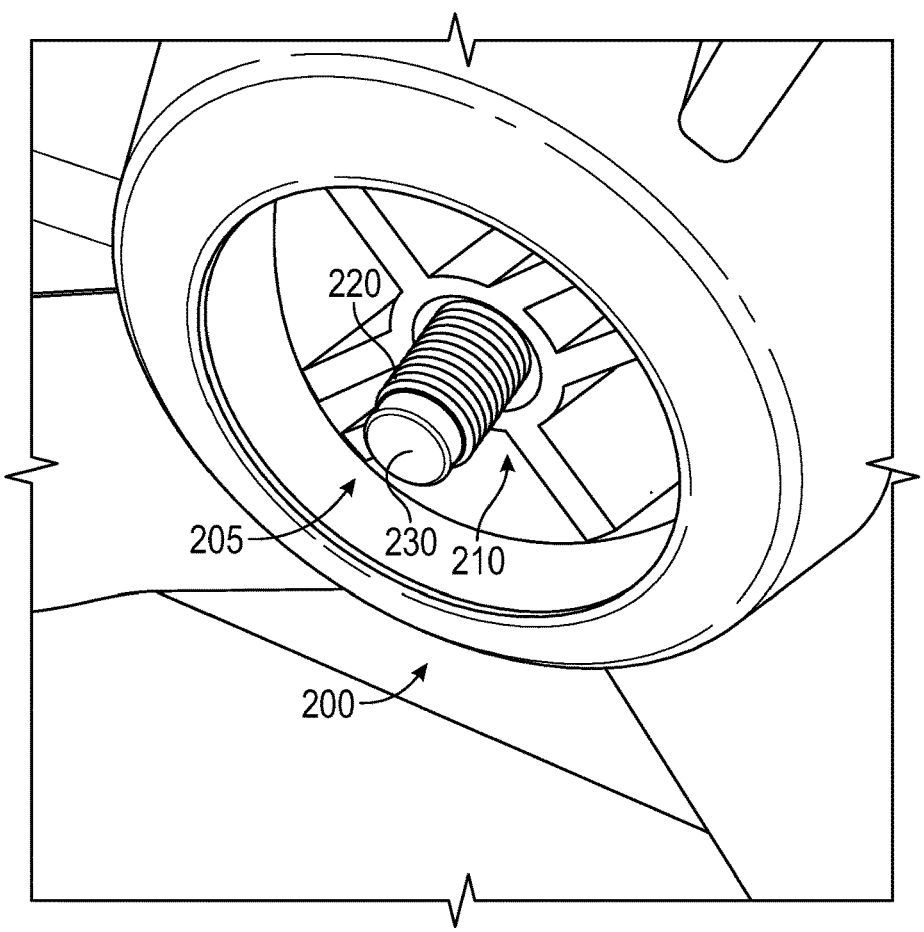
FIG. 9 shows a propeller axis of a typical marine engine with the propeller attached, forming a cup-like chamber.
Figure 10A:
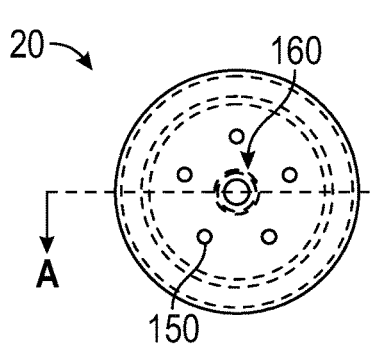
FIGS. 10a-10e shows top, bottom, side and cross-sectional views of an embodiment of the inventive propeller nut.
Figure 10B:
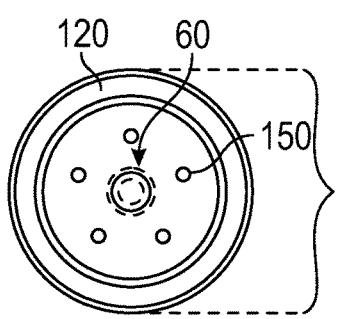
Figure 10C:
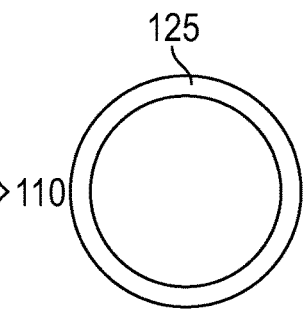
Figure 10D:
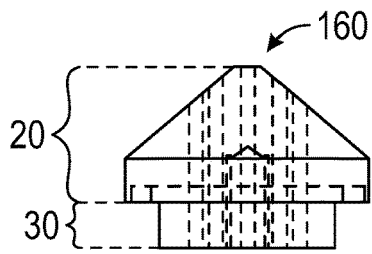
Figure 10E:
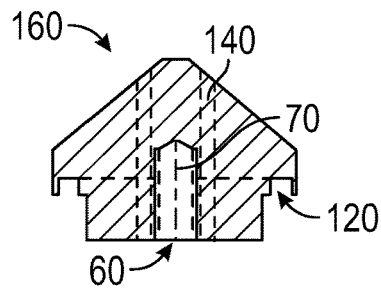
Figure 11:
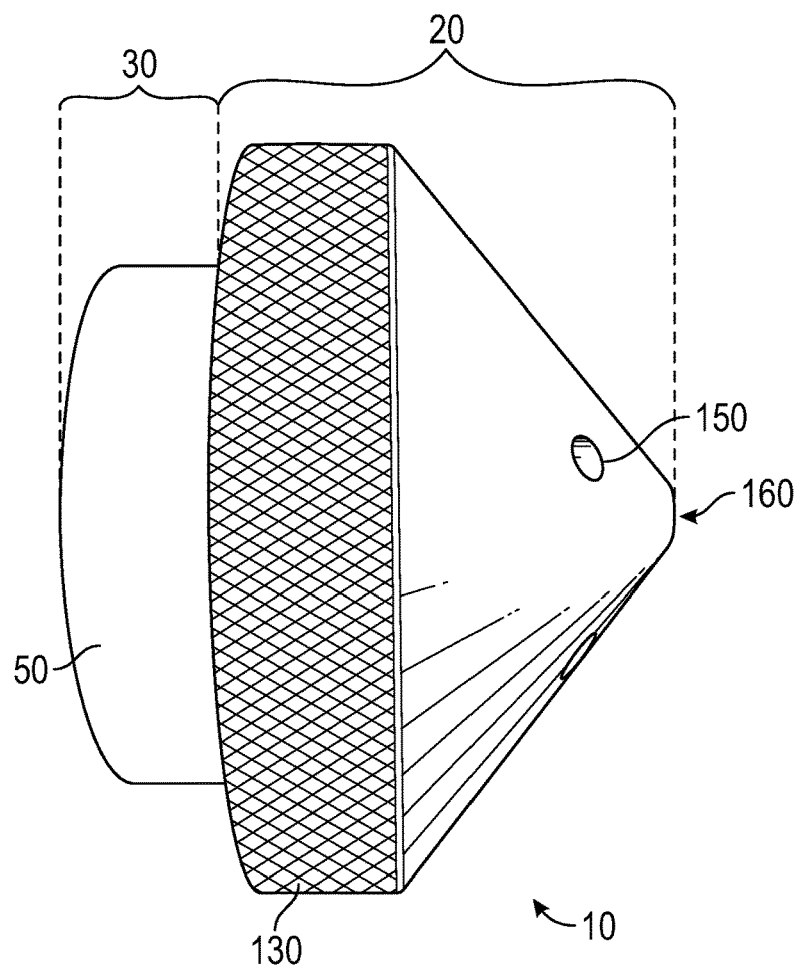
FIG. 11 shows a perspective view of the exterior portion of an embodiment of the inventive nut.
Figure 12:
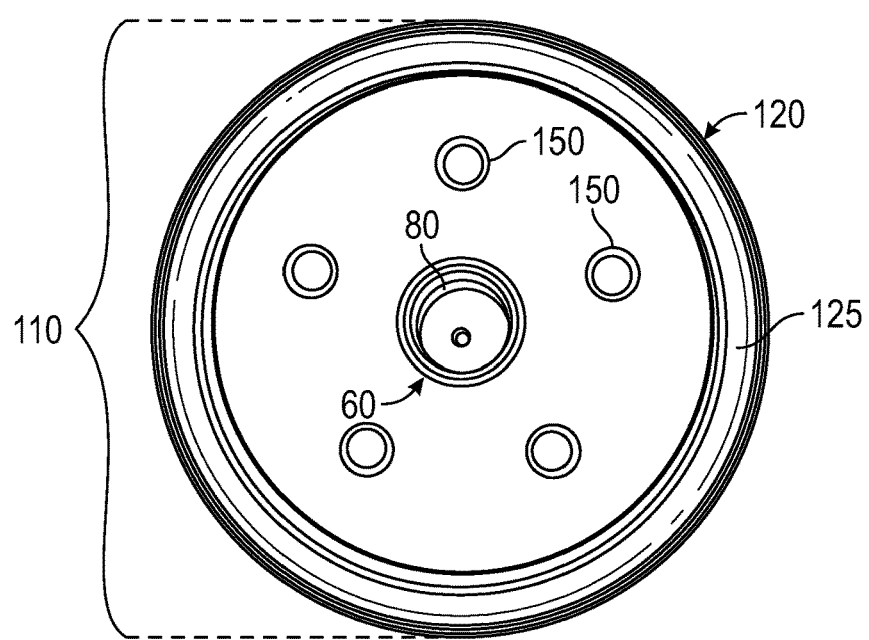
FIG. 12 shows an axial view of the propeller engaging portion of an embodiment of the inventive nut.
Figure 13:
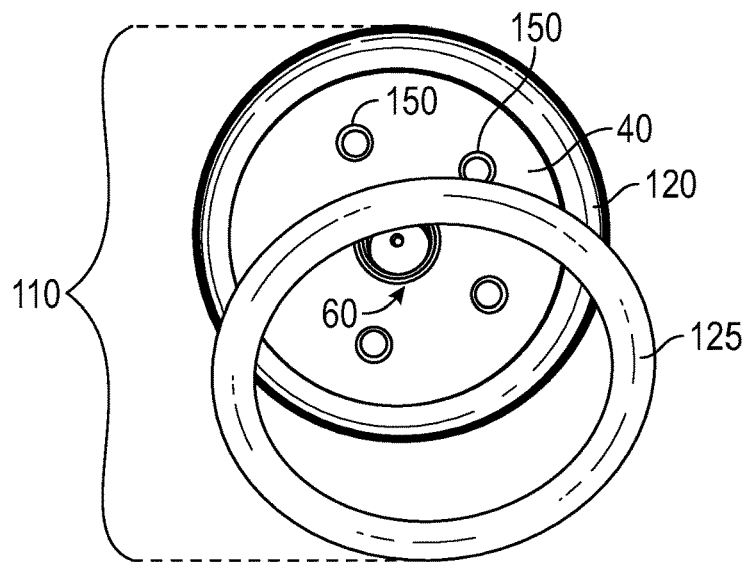
FIG. 13 shows a partially exploded view of the propeller engaging portion of an embodiment of the inventive nut and elastomeric material that may fit about the propeller engaging portion.
Figure 14:
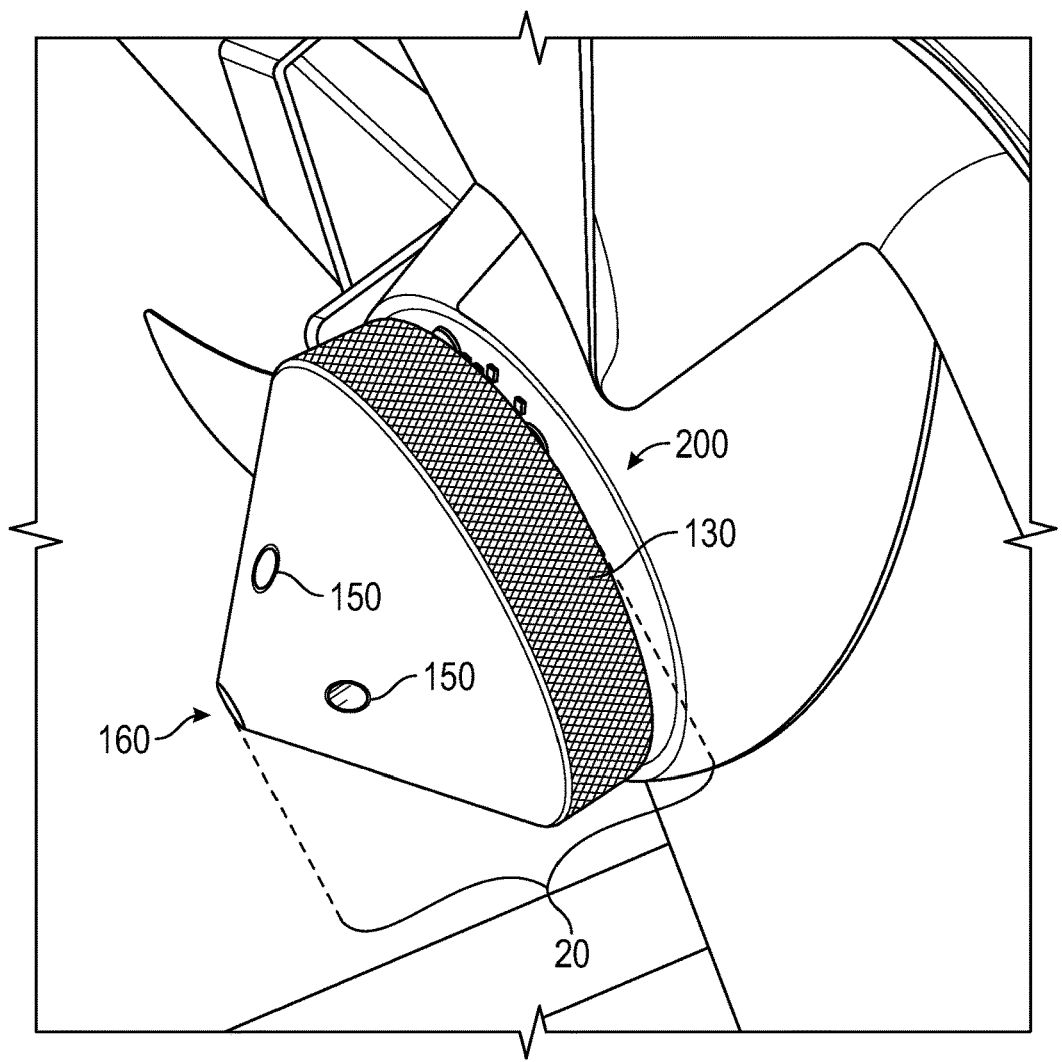
FIG. 14 shows a perspective view of the exterior portion of an embodiment of the inventive nut as it is partially engaged upon a propeller.
Figure 15:
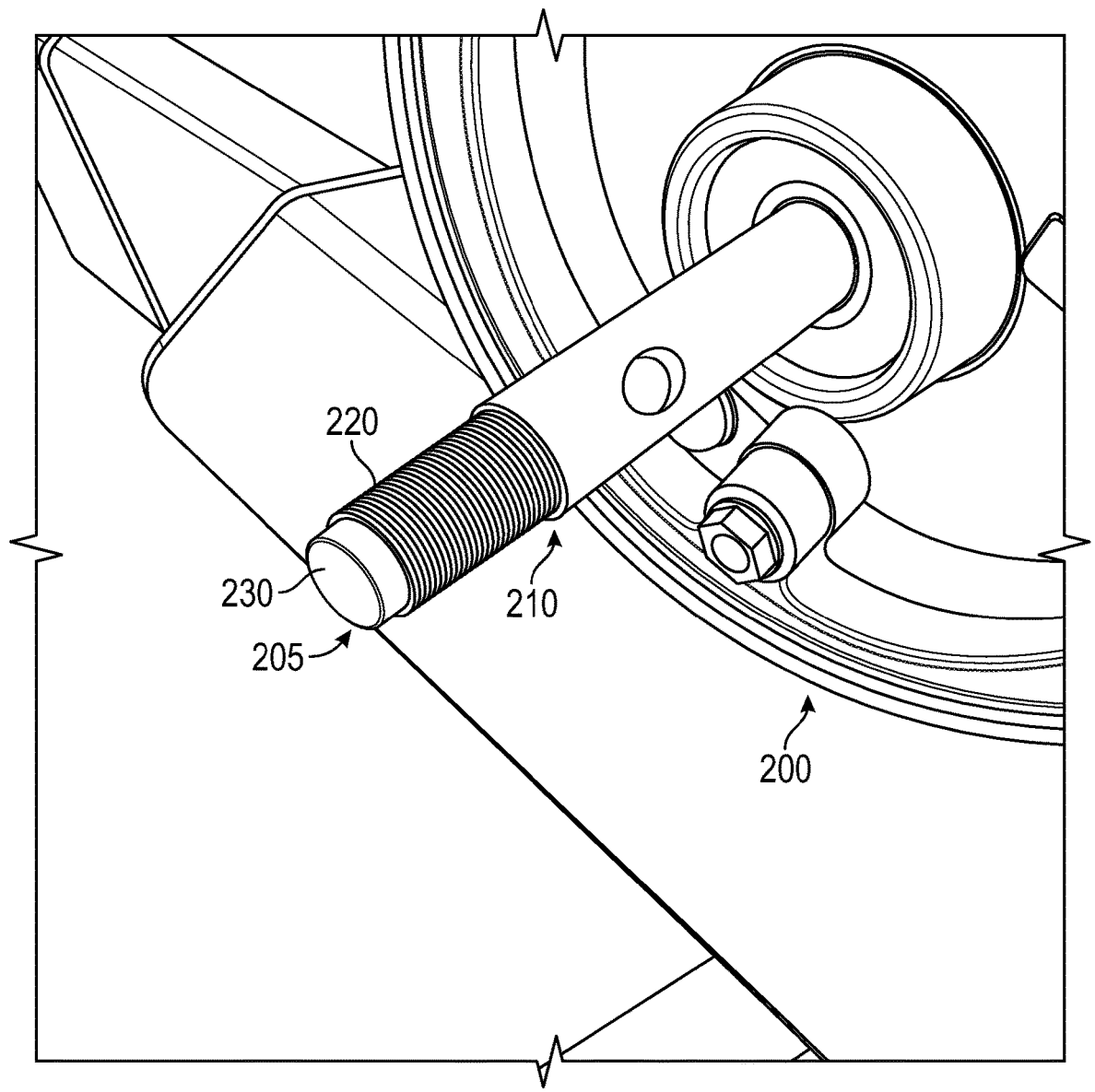
FIG. 15 shows a propeller axis of a typical marine engine upon which the inventive nut may affix.
Figure 16:
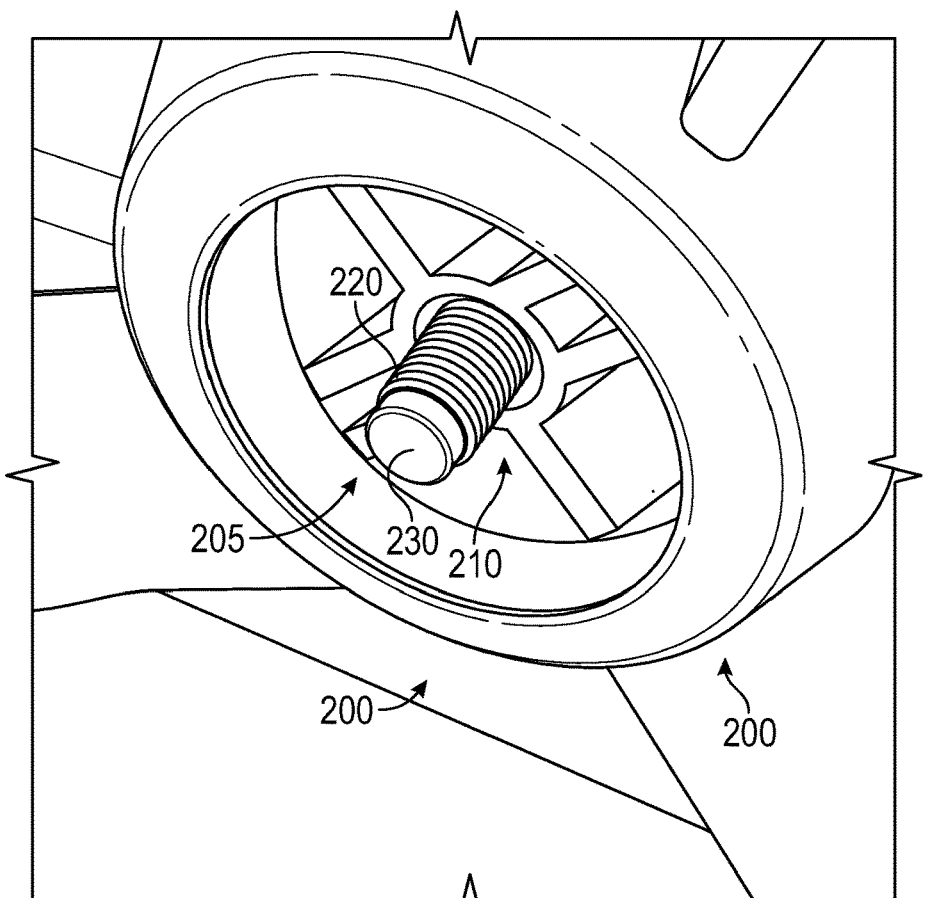
FIG. 16 shows a propeller axis of a typical marine engine with the propeller attached, forming a cup-like chamber.
Figure 17A:
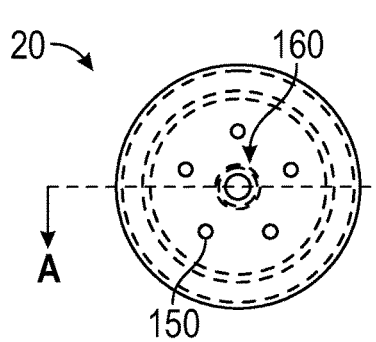
FIG. 17a-e shows top, bottom, side and cross-sectional views of an embodiment of the inventive propeller nut.
Figure 17B:
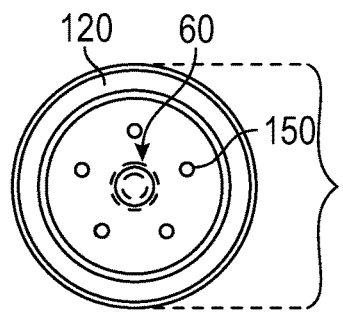
Figure 17C:
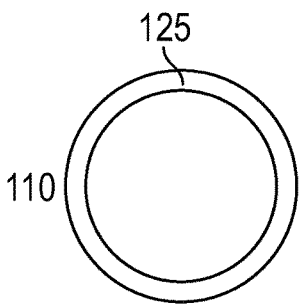
Figure 17D:
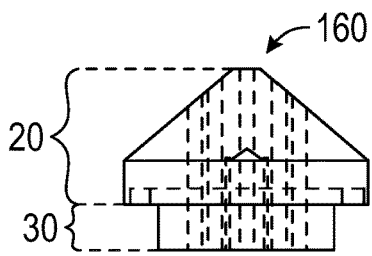
Figure 17E:
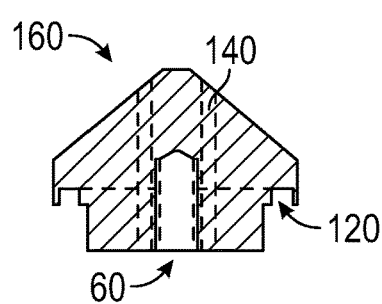

Looking at the FIGS. 1, 7-9, 14-16, a propeller securing nut 10 is depicted as securing upon a threaded portion 210 that emerges from a propeller drive assembly 200. Looking at the illustrations showing the nut 10 in use and secured upon the threaded portion 210 of the propeller drive assembly 200, an exterior portion 20 is shown that may extend from a gripping surface 100 to a terminal end 160. The gripping surface 100 is shown as cylindrical, though it may be embodied as other shapes, and may have topographical features 130 arranged thereupon. In FIG. 3, topographical features 130 are depicted as being a series of linear channels 140 into the gripping surface 100, arranged axially from a propeller end of the nut 10 towards the terminal end 160 of the exterior portion 20. Looking to FIGS. 2, 4, 7, 11 and 14, topographical features 130 are shown as having a honeycomb or interlocking features. Topographical features 130 according to embodiments of the invention may be raised from or indented into gripping surface 100. Gripping surface 100 may have some areas without topographical features 130. Other topographical features may be within the scope of the invention, including linear patterns, matrices, features that are annular and/or curved, and those with irregular properties. Gripping surface 100 may be further embodied as a gripping sleeve that is detachable from the nut 10, so that it may be replaced if worn through repeated use or trauma.

Looking now at the FIGS. 1, 3-6, 10-14, and 17 that show the nut 10 not in use or engaged to the propeller, a shaft portion 30 is seen as having a substantially cylindrical cavity with a lesser diameter than that of the exterior portion 20 of the nut 10. In other embodiments of the invention, shaft portion 30 may be constructed as having other shapes, such as rectangular, prism, oval, triangular, irregular shapes and/or those having convex and concave surfaces, or may have multiple pieces by which to engage the propeller assembly. In still other embodiments not shown, shaft may be of similar diameter to the exterior portion 20, or even larger than exterior portion 20.

The shaft portion 30 may substantially seat within a chamber of the drive shaft of the propeller that holds the threaded portion 210. At the propeller end of the substantially cylindrical element, the shaft portion 30 may have a face 40 that is substantially perpendicular to the cylindrical element and the external wall 50 of the shaft portion 30. The external wall 50 of the shaft portion 30 extends from the shaft face 40 axially towards the exterior portion 20. The shaft face 40 may include an opening 60 to a threaded shaft extending from the propeller end of the nut 10 and about an axis 70 of the shaft portion 30 to a tap end of the threaded shaft. The threaded shaft may have multiple pieces so that the threaded portion 210 may be selectively detached from or secured to the shaft.

Between the exterior portion 20 and the shaft portion 30, a propeller engaging portion 110 may be positioned to interface with the propeller assembly. As seen in FIGS. 5-6 and 12-13, propeller engaging portion 110 and particularly the shaft face 40 of the nut 10 may have an approximately perpendicular relationship to the gripping surface 100 and the shaft portion 30. The propeller engaging portion 110 may have a number of different orientations and structures to engage the propeller end of the nut 10 to the propeller, and particularly against a cup-like chamber having an exterior rim as found in most propeller assemblies and illustrated in FIGS. 9 and 16.

Propeller engaging portion 110 may comprise a groove 120 positioned about the propeller engaging portion 110. The groove 120 as shown in FIGS has an annular profile located towards the perimeter of the shaft face. Other annular grooves may be located in a number of different circumferential radii about an axis 70 of the shaft portion 30 within the scope of the invention, from an interior groove proximal to the shaft to the nearly perimeter orientation as shown, and may also have different widths according to various embodiments of the invention.

In other embodiments, groove 120 may have a path than is less regular or consistent circumference than depicted in FIGS. 5-6 and 12-13. For instance, groove may incorporate linear outlines such as rectangular, triangular or other geometric designs that form a border around the shaft of the nut 10. In another embodiment of the invention, groove may resemble ovals or other irregular shapes that have curved and/or linear elements.

Groove 120 may be capable of carrying an engaging material such as various sizes of an O-ring, or standard size 330 in preferred embodiments. Other elastomeric materials known in the arts to absorb sound, vibrations and/or harmonics may be substituted for the O-ring within other embodiments of the invention while providing an engaged seal between the propeller assembly and the propeller nut 10. Engaging material may comprise a larger structures than the pictured O-ring, including washers, gaskets and other materials that may cover up to nearly the entirety of the shaft face 40, or may have other geometric configurations that include squared, angled and/or curved aspects.

In another embodiment of the invention not depicted, the engaging material may be positioned at the interface of propeller engaging portion 110 of the nut 10 and the propeller assembly without use of a groove. For example, the engaging material may be positioned distally and around the shaft portion 30, extending axially between exterior portion 20 and the propeller assembly. By example and not limitation, a flat rubber washer may be disposed around the shaft portion 30 of the nut 10.

Propeller engaging portion 110 and the greater propeller nut 10 may have general proportions that are reflected in the illustrations or other proportions that are described but not depicted in accordance with various embodiments of the invention. As shown, the dimensions of the propeller nut 10 result in a larger size and volume than other solutions found in the prior art. Specifically, FIGS. 1-10 depict the propeller engaging portion 110 as contacting the large portions of the propeller surfaces at the mating end of the propeller. The external walls 50 of the shaft portion 30 may seat within the cup-like chamber of the propeller shaft as the threaded portion 210 of the propeller assembly turns into the threaded shaft of the shaft portion 30. Similarly, as the threaded portion 210 seats within the internal threads 80 of shaft, the propeller engaging portion 110 may seal against the rim of the cup-like chamber in the propeller shaft. In another embodiment, the propeller end of the nut 10 resembles a negative mold of the mating end of the propeller assembly. FIGS. 10-17 may illustrate a smaller embodiment of the invention fit for use on smaller engines with smaller propeller assemblies.

Figures 1A, 1B, 1C:
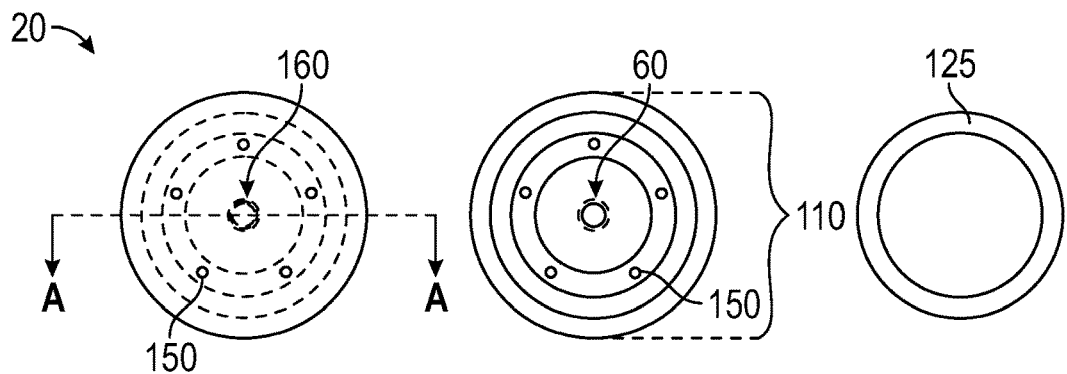
FIGS. 1a-1e shows top, bottom, side and cross-sectional views of an embodiment of the inventive propeller nut.
Figures 1D, 1E:
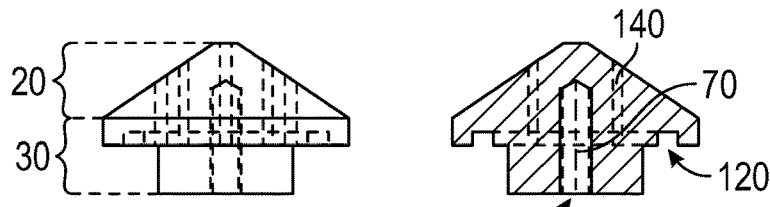

Looking further at the exterior portion 20 shown in FIGS. 1, 10 and 17, five (5) channels 140 may extend between the shaft face 40 and the terminal end 160. Journaling internally from their opening 60 at the shaft face 40 and therethrough the shaft portion 30 and then exterior portion 20, the channels 140 may emerge at various portions, up to the terminal end 160 of the propeller nut 10. As they emerge at the terminal end 160 of the exterior portion 20 shown as a tapering conical profile in FIGS. 1-7, 9-11, channels 140 may have intersections with the exterior portion 20 that are perpendicular as shown in FIG. 2, or may have curved portions at the intersections where the channels emerge at the exterior portion 20. In another embodiment of the invention, a range of 2 to 10 channels may be utilized. In other embodiments of the invention, zero to a hundreds of channels or greater with regard to including micro-channels that journal between the propeller end and the terminal end 160 of the nut 10.

According to the embodiments shown in FIGS. 1, 10 and 17, channels 140 may have a generally linear profile from the opening 60 at the shaft portion 30 to the opening 150 towards the terminal end 160 of the propeller nut 10. In other embodiments, channel 140 or channels 140 may have non-linear profiles with curved or angular paths from the opening 60 at the shaft portion 30 of the nut 10 towards the terminal end 160. The opening 150 at the terminal end 160 may be disposed closer to the gripping portion than indicated, or even become one of the topographical features of the gripping portion. In yet another embodiment, the channel may have changes in width or diameter, and even terminate between the opening 60 at the shaft portion 30 and the terminal end 160 so only one opening exists.

The inventive propeller nut 10 may be comprised of a number of different materials known in the industry to withstand water elements for marine engines. As depicted in Figs, the propeller nut 10 may be made with an aluminum composition, and finished with an anodized Type II hard coat. In other environments such as on land and in air, propeller nut 10 may be constructed of other materials known in those arts.

In use, the threaded portion 210 of the propeller assembly screws into the threaded shaft 80 of the shaft portion 30, drawing the shaft portion 30 into its complementary chamber surrounding the threaded portion 210 of the propeller assembly. As the threaded portion 210 seats at the tap end of the threaded shaft, exterior portion 20 of the nut 10 seals against a complementary circumferential cuplike chamber of the propeller assembly. The engagement of the nut 10 against the propeller assembly provides an unexpected stabilization by reducing the flexure and motion generated by the spinning propeller blades and shaft. The benefits of this inventive design are even greater. When the propeller end of the nut 10 seats fully into the propeller assembly and onto its threaded portion 210, the shaft face 40, propeller engaging portion 110 and the O-ring help to absorb and dampen the sounds, vibrations and harmonics emanating from the propeller assembly and the armature shaft that turns emerges from the motor and turns the propeller assembly. The propeller nut 10 also serves to transfer heat from the armature shaft through complete engagement of the propeller assembly and use of materials described below.

While the present invention has been described in conjunction with the specific embodiments set forth above, many alternatives, modifications and other variations thereof will be apparent to those of ordinary skill in the art. All such alternatives, modifications and variations are intended to fall within the spirit and scope of the present invention.

What is claimed is:

1. A propeller securing nut that seats onto a threaded axis of a propeller assembly, the nut comprising:
   an exterior portion having a terminal end;
   at least a portion of the exterior portion having a gripping surface;
   a propeller end of the nut axially opposite of the terminal end;
   a shaft portion of the nut between the propeller end and the exterior portion, the shaft portion having an opening to a threaded shaft of the nut into which the axis of the propeller assembly engages and secures the nut, wherein the shaft portion has a first diameter;
   at least one channel extending between the shaft portion and least one opening on the exterior portion of the nut, wherein the channel emerges at the at least one opening; and
   a propeller engaging portion configured to support an elastomeric material, wherein the propeller engaging portion further comprises a face defining a groove into which the elastomeric material is placed, the groove being disposed between an outer perimeter of the shaft portion and the threaded shaft of the nut, wherein the gripping surface of the nut is configured to be engaged by a user turned by hand such that the threaded shaft of the nut couples with the threaded axis of the propeller assembly until the face of the propeller engaging portion seats and seals against a complementary circumferential cuplike chamber of the propeller, and wherein the propeller engaging portion has a second diameter that is greater than the first diameter and wherein a first distance between the terminal end and the propeller end is greater than a second distance between the terminal end and the propeller engaging portion.

2. The propeller securing nut of claim 1, wherein the threaded shaft of the nut further comprises internal threads for contacting the threaded axis of the propeller assembly.

3. The propeller securing nut of claim 1, whereby the face is positioned approximately perpendicular to the shaft portion of the nut.

4. The propeller securing nut of claim 3, the groove being disposed about the face.

5. The propeller securing nut of claim 1, whereby the first diameter is a lesser diameter than a diameter of the exterior portion, forming a face of the exterior portion.

6. The propeller securing nut of claim 5, whereby the elastomeric material is a washer and is friction fit around the shaft portion, the elastomeric material covering at least a portion of the face.

7. The propeller securing nut of claim 1, further comprising a topographical feature at the gripping surface, the topographical feature being raised or indented and being linear or non-linear.

8. The propeller securing nut of claim 1, wherein the gripping surface further comprises linear elements disposed in an axial orientation.

9. A propeller securing nut that seats onto a threaded axis of a propeller assembly, the nut comprising:
   an exterior portion having a terminal end;
   a gripping surface;
   a propeller end of the nut axially opposite of the terminal end;
   a shaft portion of the nut between the propeller end and the exterior portion, the shaft portion having an opening to a threaded shaft of the nut into which the axis of the propeller assembly engages and secures the nut, the shaft portion having a shaft face positioned towards the propeller end of the nut, wherein the shaft portion has a first diameter;
   at least one channel extending between the shaft face and at least one opening on the exterior portion of the nut, wherein the at least one channel emerges at the at least one opening, and wherein the channel is configured to release heat generated by a motor powering the propeller assembly; and
   a propeller engaging portion, configured to support an elastomeric material disposed about the shaft face, wherein the gripping surface of the nut is configured to be engaged by a user turned by hand such that the threaded shaft of the nut couples with the propeller assembly so that the shaft face of the propeller engaging portion seats and seals against a complementary circumferential cuplike chamber of the propeller, wherein the propeller engaging portion has a second diameter that is greater than the first diameter and wherein a first distance between the terminal end and the propeller end is greater than a second distance between the terminal end and the propeller engaging portion.

10. The propeller securing nut of claim 9, wherein the at least one channel comprises the threaded shaft of the nut.

11. The propeller securing nut of claim 9, the gripping surface at least partially comprising a topographical feature.

12. The propeller securing nut of claim 9, the terminal end having a lesser diameter than the gripping surface of the exterior portion.

13. A propeller securing nut that seats onto a threaded axis of a propeller assembly, the nut comprising:
   an exterior portion having a terminal end;
   a gripping surface;
   a propeller end of the nut axially opposite of the terminal end, the propeller end of the nut sealing completely against the propeller;
   a shaft portion of the nut between the propeller end and the exterior portion, the shaft portion having an opening to a shaft of the nut into which the axis of the propeller assembly engages and secures the nut, the shaft portion having a shaft face positioned adjacent to the propeller end of the nut, wherein the shaft portion has a first diameter;
   at least one channel extending between the shaft face and at least one opening on the exterior portion of the nut, wherein the channel emerges at the at least one opening, and wherein the channel is configured to release heat generated by a motor powering the propeller assembly; and
   a propeller engaging portion, wherein the propeller engaging portion has a second diameter that is greater than the first diameter and wherein a first distance between the terminal end and the propeller end is greater than a second distance between the terminal end and the propeller engaging portion, wherein the shaft face seats and seals against a complementary circumferential cuplike chamber of the propeller.

14. The propeller securing nut of claim 13, the exterior portion of the nut comprising an arcuate aspect.

15. The propeller securing nut of claim 13, the gripping surface at least partially further comprising topographical features.

16. The propeller securing nut of claim 13 further comprising a groove about the shaft face.

17. The propeller securing nut of claim 13 further comprising an elastomeric material positioned at an interface of the propeller end of the nut and the propeller assembly.

* * * * *